United States Patent [19]

Derman

[11] Patent Number: 4,768,361
[45] Date of Patent: Sep. 6, 1988

[54] SPARE TIRE LOCKING DEVICE

[76] Inventor: Jay S. Derman, 4141 Dixie Canyon Ave., Sherman Oaks, Calif. 91423

[21] Appl. No.: 142,426

[22] Filed: Jan. 11, 1988

[51] Int. Cl.$^4$ ............................................. E05B 65/12
[52] U.S. Cl. ........................................ 70/259; 70/14
[58] Field of Search .................. 70/259, 260, 258, 14, 70/360–361; 414/462, 463, 466; 224/42.23, 42.25, 42.41; 59/78, 78.1

[56] References Cited

U.S. PATENT DOCUMENTS

| 3,372,821 | 3/1968 | Podhajsky | 224/42.25 |
| 3,790,012 | 2/1974 | Hrivnyck | 70/259 |
| 3,865,264 | 2/1975 | Kuhns | 224/42.23 |
| 3,939,677 | 2/1976 | Drayton | 70/14 |
| 4,249,682 | 2/1981 | Yasue | 224/42.23 |
| 4,282,995 | 8/1981 | Austin | 70/259 |
| 4,377,366 | 3/1983 | Hamlyn | 414/466 |
| 4,537,555 | 8/1985 | Combs | 414/463 |
| 4,565,080 | 1/1986 | Kincaid | 70/371 |
| 4,613,273 | 9/1986 | Wagner | 414/463 |

Primary Examiner—Robert L. Wolfe
Attorney, Agent, or Firm—Monty Koslover

[57] ABSTRACT

A device for locking the spare tire wheel of a pickup truck in place so that it can not be lowered from the truck body and removed by unauthorized persons. The device is made of two metal steel assemblies, one of which is a rectangular tube and the other a cylindrical plug. In this application, the spare tire wheel is stowed underneath the rear of the truck body and held up by a hoist chain that is operated by a hoist mechanism fastened to the truck body. The rectangular tube is placed over the dangling hoist chain and pushed up to the hub. The cylindrical lock plug is inserted and locked, preventing movement of the hoist chain up and down and thereby preventing lowering of the spare tire wheel. In design, the locking device is massive, weatherproofed and not susceptible to breaking or damage.

5 Claims, 2 Drawing Sheets

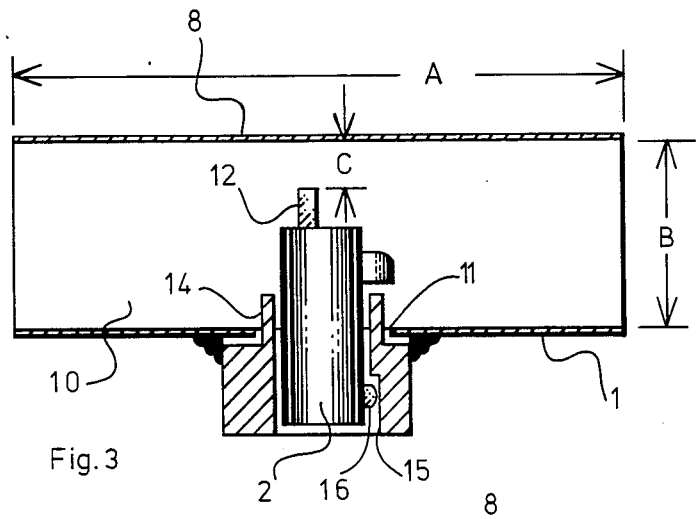
Fig. 3
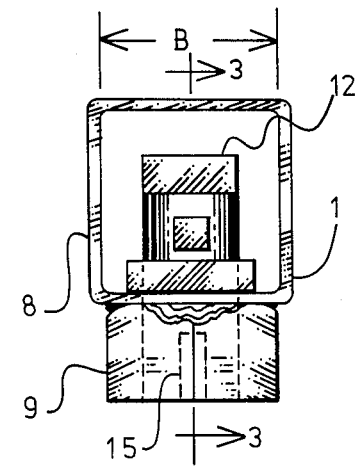
Fig. 2
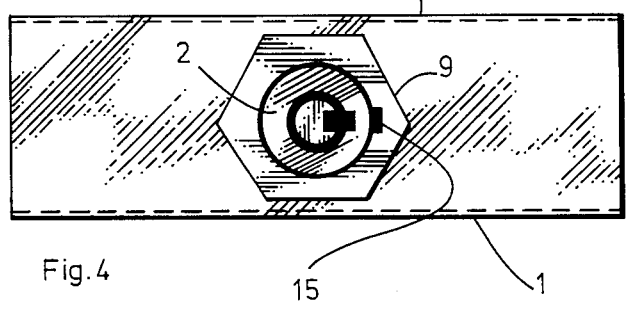
Fig. 4
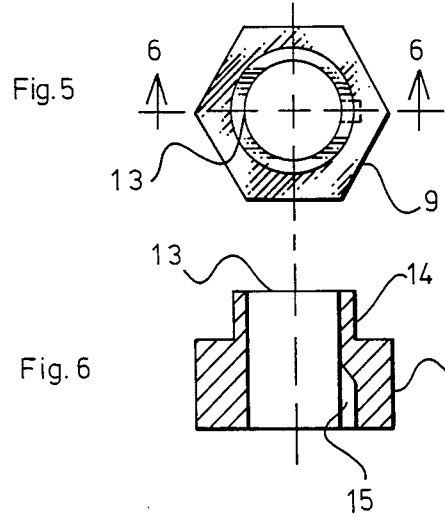
Fig. 5
Fig. 6
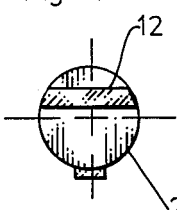
Fig. 7C
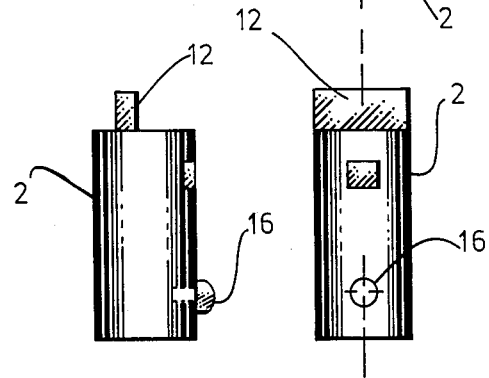
Fig. 7A    Fig. 7B

SPARE TIRE LOCKING DEVICE

BACKGROUND OF THE INVENTION

For many model pickup trucks, the spare tire wheel is stowed underneath and at the rear of the truck body. A method of stowage favored by many auto manufacturers is to support the spare tire by a chain hoist mechanism that is fastened to the underside of the truck body. In use, the spare tire is held by its wheel hub and pressed tightly up against the underside of the truck body. There is no access to the area above the wheel hub except for a small hole in which is inserted, when needed, the key for lowering or raising the tire.

Unfortunately, would be tire thieves have obtained hoist keys and used them to lower the spare tire from the truck and steal the spare tire. There is therefore, a need for a locking device that will prevent such unauthorized removal of the spare tire, while at the same time, allow an authorized person to open the locking device and lower the spare tire.

In the prior art, various padlocks and cable locks have been used to secure the hoist chain where it hangs underneath the spare tire wheel hub. However, all of these devices can be cut by heavy wire snips, or the hoist chain can be cut above the locking device, allowing the chain to move upwards and the tire to be lowered. There is thus a need for a spare tire locking device that, while open to access, can not be easily cut or tampered with, and preventing access to the hoist chain above the locking device.

SUMMARY OF THE INVENTION

The invention comprises two metal steel assemblies which are a tube/lock alignment assembly and a modified cylindrical lock plug. When in use, the tube/lock alignment assembly is placed so that the chains projecting below the hub of the spare tire pass through the longitudinal cavity of the rectangular shaped tube, and the end of the tube is pushed tight upwards against the tire hoist bar. The cylindrical lock plug is then inserted in the alignment nut attached to the tube and perpendicular to the chain links which pass through the tube. A bearing ridge formed on the end of the lock plug bears across and against the chain links, pinning them against the inside wall of the tube and preventing their longitudinal movement.

The device is massive and made of steel parts of a thickness not susceptible to easy cutting, bending or breaking. Except for its key insertion end, the cylindrical lock plug is not accessible from the outside.

Accordingly, it is a principal object of this invention to provide a device that will securely lock the spare tire hoist chain in place and prevent unauthorized removal of the spare tire from the pickup truck.

Another object is to provide a simple, economical device that, while open to access, can not be easily tampered with. It is yet another object to provide a device that will withstand an outdoor all-weather environment.

Further objects and advantages of the present invention will be apparent from the study of the following portions of the specification, the claims and the attached drawings.

BRIEF DESCRIPTION OF THE DRAWINGS

FIG. 2 is an end elevation view of the device;

FIG 3 is a side cutaway view of the device taken along line 3—3 of FIG. 2;

FIG 4 is a plan view of the present invention;

FIG. 5 is a plan view of the lock alignment nut;

FIG. 6 is a side elevation view of the lock alignment nut taken along line 6—6 of FIG. 5; and FIGS. 7A, 7B and 7C are respectively, a side elevation view, a plan view and a top view of the modified cylindrical lock plug.

DESCRIPTION OF THE PREFERRED EMBODIMENT

Figure 1:
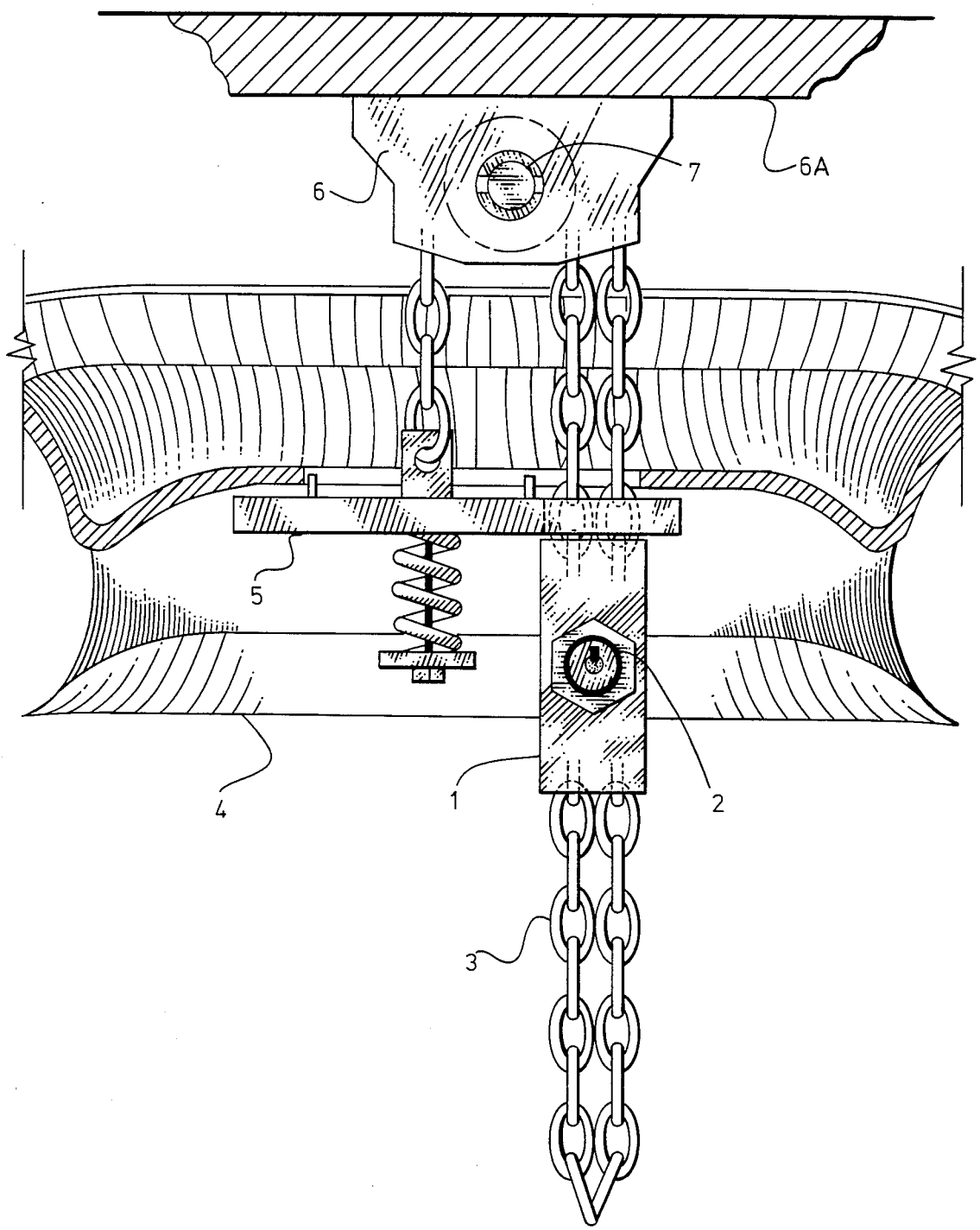
FIG. 1 is a partial cutaway view of the spare tire assembly showing the present invention locked in place on the projecting portion of the tire hoist chain below the hub.

Referring particularly to the drawings, there is shown in FIG. 1 a preferred embodiment of the spare tire locking device 1 in place, locking the spare tire hoist chain 3 in position and preventing its movement up or down. For the sake of clarity, FIG. 1 shows the spare tire and wheel hub cut away so that the operation of the wheel hoist can be seen. In actual practice, the spare tire 4 wheel is jammed up tight against the truck underbody 6A and only the underside of the tire 4, chain 3 and hoist bar 5 can be seen under the truck. The upper surface of the tire is inaccessible. A small opening in the rear lower frame of the truck body allows the insertion of the long hoist key across the top of the tire and into the turning mechanism 7 of the hoist 6. The hoist chain 3 passes through a slot in hoist bar 5 and through a hole in the wheel hub, up and over a wheel ratchet mechanism in the hoist 6 and down through the wheel hub where the chain is connected to the hoist bar 5. By rotating the turning mechanism 7 of the hoist, the chain 3 lowers or raises the spare tire 4. With the spare tire locking device 1 in place as shown, the chain 3 can not be made to rotate through the hoist mechanism 6 and the spare tire 4 can not be lowered. Insertion of a key in the cylindrical lock plug 2 can release the chain and allow its free movement.

Referring now to FIGS. 2, 3 and 4, there are shown views of the invention fully assembled, with the modified cylindrical lock plug 2, locked in place with lock pin extended as it would be if placed on the hoist chain. The length A of the tube body 8 is made sufficiently long to contain 5 to 6 chain links, within the tube cavity 10, while the inside dimension B of the tube body 8 is a little over twice the width of the chain links. In this way, two lengths of chain 3 may be passed through the tube cavity 10 side by side. When the cylindrical lock plug 2 is keyed in place as shown in FIGS. 2 and 3, and the lock pin is extended, the space C between the top of bearing ridge 12 and the inside wall of tube 8 is approximately equal to twice the chain 3 link thickness. Thus, the top of bearing ridge 12 will push against the chain links, preventing their movement, except for less than half a link distance in either longitudinal direction. The lock plug 2 is housed and protected by the lock alignment nut 9 and tube 8 so that only its key face is accessible. This provides added security.

The device is comprised of two metal steel assemblies. These are a tube/lock alignment assembly and a modified cylindrical lock plug 2. The tube/lock alignment assembly comprises two parts: a rectangular tube body 8 and a lock alignment nut 9. A first hole 11 is located in the center of one face of the tube body 8. The shoulder or neck portion 14 of the lock alignment nut 9 is placed in the first hole 18 and arranged so that a keying groove 15 in the nut 9 is lined up with the longitudinal axis of the tube body 8. The lock alignment nut 9 is then welded to the tube body 8. The combination of keying groove 15 and alignment pin 16 on the cylindrical lock plug 2 ensure that the bearing ridge 12 will bear across the chain links, 90 degrees to their long axis.

Referring again to the drawings, FIGS. 5 and 6 show a plan view and a cross-section view of the lock alignment nut 9. A second hole 13 is bored through the axis of the nut with a hole diameter sufficient to fit the cylindrical lock plug 2 with clearance. A neck 14 is formed to enable insertion of the nut through the first hole 11 in the tube body 8. A keying groove 15 is formed in one location on the inside surface of the nut hole 13 for approximately half of its height.

Both the tube body 8 and the lock alignment nut 9 are massive and fabricated of steel, with the thickness of the tube walls being approximately 0.050 in. or more. After the lock alignment nut 9 is welded to the tube body 8, the assembly is painted for corrosion protection.

Referring now to FIGS. 7A, 7B and 7C, there are shown three views of the modified cylindrical lock plug 2. The lock plug 2 has been modified so that a bearing ridge 12 is formed in the end of the cylinder opposed to the lock opening, and an aligning pin 16 is added to the longitudinal surface of the lock plug 2. The aligning pin 16 is located so that its axis is perpendicular to the axis formed by the bearing ridge 12. This is done so that when the aligning pin 16 is fitted into the keying groove 15 in the lock alignment nut 9, the long axis of bearing ridge 12 of cylindrical lock plug 2 will be perpendicular to the longitudinal axis of tube body 8. The cylindrical lock plug is made of stainless steel.

From the foregoing description, it is believed that the preferred embodiment achieves the objects of the present invention. Alternative embodiments and modifications of the embodiments depicted will be apparent to those skilled in the art. These and other alternatives are considered to be equivalent and within the spirit and scope of the present invention.

Having described the invention, what is claimed is:

1. A locking device for attachment to the hoist chain of a spare tire hoist used on pickup trucks and similar equipment, so that a portion of the chain is contained within the device and restrained from movement, preventing the spare tire hoist from being operated to lower the spare tire; said locking device comprising two metal steel assemblies: a tube/lock alignment assembly and a modified cylindrical lock plug; said tube/lock alignment assembly comprising a rectangular tube body made of steel and a lock alignment nut made of steel; said lock alignment nut having a stepped neck portion inserted in and welded to said tube body and oriented in a manner such that a key alignment groove cut in said alignment nut is aligned with the longitudinal axis of said rectangular tube body; said cylindrical lock plug being made of stainless steel and modified so that a bearing ridge is formed in one end of the lock plug opposed to the lock opening and an aligning pin is added to the cylindrical longitudinal surface of said lock plug; said cylindrical lock plug being provided for the purpose of fitting in said lock alignment nut and projecting into said tube body perpendicular to the tube longitudinal axis so that, when said cylinder lock mechanism is rotated by use of a key, a lock pin extends, preventing removal of said lock plug; said lock plug being aligned by means of its aligning pin fitting in said key alignment groove, causing its bearing ridge on the end of said plug to bear lengthwise across the width of said tube body; said cylindrical lock plug when locked in position, bearing against the chain links of said spare tire hoist, preventing their movement with respect to said locking device, and preventing the spare tire from being lowered by unauthorized persons.

2. A locking device as set out in claim 1 wherein: said rectangular tube body is fabricated of tube steel having a wall thickness of approximately 0.050 in. for strength and rigidity; said tube body having a length sufficiently long to contain 5 to 6 hoist chain links, and an inside tube dimension a little over twice the width of the hoist chain links, allowing two lengths of chain to lie flat within said tube body and be engaged by the bearing ridge of said cylindrical lock plug; said tube body having a first hole located in the center of one face and having a hole diameter sufficient to permit inserting the neck of said lock alignment nut prior to welding to form the tube/lock alignment assembly.

3. A locking device as set out in claim 1 wherein: said lock alignment nut has a second hole bored through it at the center along its longitudinal axis, said second hole being sized to allow said cylindrical lock plug to fit snugly, and holding said cylindrical lock plug in place.

4. A locking device as set out in claim 1 wherein: said cylindrical lock plug is sized and shaped so that, when inserted in said tube/lock alignment assembly and locked in place, the space between the top of the lock plug bearing ridge and the inside wall of said tube body is approximately equal to twice the hoist chain thickness, thus causing the lock plug bearing ridge to pin the hoist chain links to the inside wall of said tube body, preventing their longitudinal movement.

5. A locking device for attachment to the hoist chain of a spare tire hoist used on pickup trucks and similar equipment, so that a portion of the chain is contained within the device restrained from movement, preventing the spare tire hoist from being operated to lower the spare tire; said locking device comprising two metal steel assemblies: a tube/lock alignment assembly and a modified cylindrical lock plug; said cylindrical lock plug for insertion into an alignment hole provided in the tube/lock alignment assembly perpendicular to its long axis, after the hoist chain has been passed through said tube/lock alignment assembly, and thereby applying pressure on said hoist chain preventing its movement up and down; said tube/lock alignment assembly being massive and made of steel so as to be inflexible and difficult to cut or break; said cylindrical lock plug being located and housed so as to protect all but its key face from access and interference from outside, providing added security; said tube/lock alignment assembly being painted for protection against corrosion due to an outdoor all-weather environment.

* * * * *